(12) United States Patent
Liang et al.

(10) Patent No.: US 8,948,070 B2
(45) Date of Patent: Feb. 3, 2015

(54) SCHEDULING METHOD AND SYSTEM FOR HIGH SPEED UPLINK PACKET ACCESS

(75) Inventors: Zijun Liang, Shenzhen (CN); Zhuo Yang, Shenzhen (CN); Chen Wang, Shenzhen (CN); Changchun Tang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 687 days.

(21) Appl. No.: 12/521,742

(22) PCT Filed: Jan. 10, 2007

(86) PCT No.: PCT/CN2007/000089
§ 371 (c)(1),
(2), (4) Date: Nov. 2, 2010

(87) PCT Pub. No.: WO2008/080264
PCT Pub. Date: Jul. 10, 2008

(65) Prior Publication Data
US 2011/0038323 A1    Feb. 17, 2011

(30) Foreign Application Priority Data
Dec. 31, 2006  (CN) .......................... 2006 1 0156470

(51) Int. Cl.
*H04W 4/00* (2009.01)
*H04L 12/28* (2006.01)
(Continued)

(52) U.S. Cl.
CPC ............ *H04L 47/60* (2013.01); *H04L 12/5693* (2013.01); *H04L 47/522* (2013.01); *H04L 47/6235* (2013.01); *H04W 72/1252* (2013.01); *H04W 72/1268* (2013.01)

USPC ........... 370/311; 370/329; 455/522; 455/450; 455/451

(58) Field of Classification Search
CPC ............ H04L 47/60; H04W 28/0221; H04W 52/0225; H04W 52/24; H04W 72/0406; H04W 72/0413; H04W 72/1226; H04W 72/1252
USPC ......... 370/335–338, 311–312, 328–332, 444; 455/450–452.2, 522, 561
See application file for complete search history.

(56) References Cited

U.S. PATENT DOCUMENTS

2004/0165559 A1    8/2004  Kwak
2005/0220116 A1*   10/2005 Ahn et al. .................. 370/395.4
(Continued)

FOREIGN PATENT DOCUMENTS

| CN | 1819674 A | 8/2006 |
|---|---|---|
| CN | 1819677 A | 8/2006 |
| EP | 1447938 A2 | 8/2004 |

OTHER PUBLICATIONS

International Search Report in International Application No. PCT/CN2007/000089, dated Oct. 18, 2007.
(Continued)

*Primary Examiner* — Un C Cho
*Assistant Examiner* — Jeremy Costin
(74) *Attorney, Agent, or Firm* — Bright IP Law Offices

(57) ABSTRACT

A scheduling method and system for high speed uplink packet access which comprises the following two-level scheduling: a first level scheduling for distributing the target rise over thermal (RoT) of each user equipment (UE); and a second level scheduling for tracking the assigned to target RoT via transmitting a relative authority instruction, according to the current authority and channel quality of the UE.

12 Claims, 6 Drawing Sheets

(51) Int. Cl.
*H04B 7/00* (2006.01)
*H04W 72/00* (2009.01)
*H04L 12/869* (2013.01)
*H04L 12/54* (2013.01)
*H04L 12/873* (2013.01)
*H04L 12/863* (2013.01)
*H04W 72/12* (2009.01)

(56) References Cited

U.S. PATENT DOCUMENTS

| | | | |
|---|---|---|---|
| 2005/0249164 A1* | 11/2005 | Kwak et al. | 370/335 |
| 2006/0178112 A1 | 8/2006 | Wigard et al. | |
| 2006/0286995 A1* | 12/2006 | Onggosanusi et al. | 455/522 |
| 2008/0004031 A1* | 1/2008 | Rong et al. | 455/452.1 |
| 2008/0214197 A1* | 9/2008 | Englund et al. | 455/450 |

OTHER PUBLICATIONS

Written Opinion in International Application No. PCT/CN2007/000089, dated Sep. 26, 2007.

European Patent Office, Extended European Search Report for EP Application No. 07702021.2 (PCT/CN2007/000089) dated Sep. 4, 2012.

"Universal Mobile Telecommunications System (UMTS); FDD enhanced uplink; Overall description; Stage 2 (3GPP TS 25.309 version 6.6.0 Release 6); ETSI TS 125 309", IEEE, LIS, Sophia Antipolis Cedex, France, vol. 3-R2, No. V6.6.0, Mar. 1, 2006, XP014034283, ISSN: 0000-0001.

Samsung: "Overall RoT management", 3GPP Draft; RI-041377 Target ROT, 3rd Generation Partnership Project (3GPP), Mobile Competence Centre, 650, Route Des Lucioles; F-06921 Sophia-Antipolis Cedex, France, vol. RAN WGI, No. Yokohama, Japan; 20041112, Nov. 12, 2004, XP050099558.

P.R. China, State Intellectual Property Office, The First Examination Opinion for CN Application No. 2006101564702 dated Jan. 8, 2010.

English Summary of the First Examination Opinion of P.R. China State Intellectual Property Office for CN Application No. 2006101564702 dated Jan. 8, 2010.

* cited by examiner

SCHEDULING METHOD AND SYSTEM FOR HIGH SPEED UPLINK PACKET ACCESS

CROSS REFERENCE TO RELATED APPLICATIONS OR PRIORITY CLAIM

This application is a national phase of International Application No. PCT/CN2007/000089, entitled "SCHEDULING METHOD AND SYSTEM FOR HIGH SPEED UPLINK PACKET ACCESS", which was filed on Jan. 10, 2007 and which claims priority of Chinese Patent Application No. 2006101456470.2, filed Dec. 31, 2006.

FIELD OF THE INVENTION

The present invention relates to service scheduling of radio communication system, in particular to a scheduling method and system for High Speed Uplink Packet Access.

BACKGROUND OF THE INVENTION 3G (the third generation) radio mobile communication evolves successively in which new requirements are introduced continuously to achieve low cost and high performance. In Release 5 (R5) and Release 6 (R6), High Speed Downlink Packet Access (HSDPA) and High Speed Uplink Packet Access (HSUPA) are respectively introduced for the purpose of increasing the throughput of a single cell and the peak rate of single user equipment (UE) of the system by fully taking advantages of the limited radio resource, more rapidly responding to the request by UE and reducing the delay.

HSUPA is the technology by which Wideband Code Division Multiple Access (WCDMA) system improves the uplink transmission capability, wherein it is mainly introduced three technologies: Hybrid Automatic Repeat Request (HARD) of the physical layer; rapid scheduling based on Node B (base station); short frame transmission of 2 ms TTI (Transmission Timing Interval). The performance of HSUPA system significantly exceeds that of the traditional WCDMA in uplink service transmission, in which the system capability is increased by about 50%-70%, the delay of end-to-end packet is reduced by 20%-55%, and the user packet call traffic is increased by about 50%.

The WCDMA system employing HSUPA technology comprises a radio network controller (RNC), Node B and a UE. By measuring uplink load of each cell and the channel quality of the UE duly, Node B determines the authority distributed to each UE according to the measured uplink load of the cell, the current channel quality of the UE, and the scheduling request information of the UE as well as the priority of the UE, then transmits the corresponding scheduling instruction to the corresponding UE which, according to the authority of Node B, selects appropriate transmission format combination from the E-TFC (Enhanced Transport Format Combination) table which is preconfigured to the UE by RNC, so as to transmit uplink E-DCH (Enhanced Dedicated Channel) data to Node B.

In HSUPA, the authority can be transmitted to the UE via the following three ways:

1. During establishing the radio link, the serving Node B distributes initial authority which is transmitted to the UE via RNC. The authority is an absolute authority;
2. The serving Node B transmits the authority to the UE via E-DCH absolute grant channel (E-AGCH, E-DCH) with the authority being an absolute authority;
3. The serving Node B and the non-serving Node B transmit the authority to the UE via E-DCH relative grant channel with the authority being a relative authority, as shown in FIG. 1; the serving Node B can transmit UP (the authority for increasing one step length), DOWN (the authority for decreasing one step length) and HOLD (keeping the current authority unchanged), and the non-serving Node B can transmit DOWN and HOLD wherein the particular step length is determined by the configuration of RNC.

The relationship between E-RGCH channel time and the time of the primary common control physical channel (P-CCPCH) and dedicated physical channel (DPCH) is shown in FIG. 2. As for the serving Node B, the UE with 10 ms E-DCH TTI has the following equation:

$$\tau_{E\text{-}RGCH,n} = 5120 + 7680 \times \left\lfloor \frac{(\tau_{DPCH,n}/256) - 70}{30} \right\rfloor$$

The UE with 2 ms E-DCH TTI has the following equation:

$$\tau_{E\text{-}RGCH,n} = 5120 + 7680 \times \left\lfloor \frac{(\tau_{DPCH,n}/256) + 50}{30} \right\rfloor$$

For non-serving Node B, $\tau E\text{-}RGCH = 5120$ chips.

wherein, $\tau_{E\text{-}RGCH,n}$ is the drift of E-RGCH respective to PCCPCH channel with the unit of chip, and $\tau_{DPCH,n}$ is the drift of DPCH respective to PCCPCH channel with the unit of chip, which is in the range of 0.38144 and has the step length of 256 chips.

By the above description, there is no strict requirement on time for the initial authority and the authority granted to UE via E-AGCH. As for the authority value granted to UE via E-RGCH which is the LUPR of the same HARQ process with respect to the previous HARQ round-trip-time (HARQ_RTT), a strict time requirement is imposed on the time of the schedule wherein this HARQ process is used in the previous round-trip-time (RTT) to schedule the index value in the quantization table corresponding to the power drift between the enhanced dedicated physical data channel (E-DPDCH) for data transmission and the dedicated physical control channel (DPCCH). According the relationship between the time sequence of E-RGCH and the time sequence of PCCPCH and downlink DPCH (as shown in FIG. 2), E-RGCH has 5 time points of transmission in each frame which are respectively corresponding to 2nd slot, $5^{th}$ slot, $8^{th}$ slot, 11th slot, and 14th slot of PCCPCH, therefore the scheduling interval generally is 2 ms so as to ensure that all HARQ processes of all UEs can schedule E-RGCH.

In the existing scheduling method, the scheduling happens every 2 ms, therefore it is required to calculate the cell load and the load currently occupied by individual UEs so as to calculate the rise over thermal (RoT) of the cell usable by the Serving E-DCH, then the RoT resource of the cell is assigned to among the Serving UEs based on specific scheduling algorithm, thereafter it is determined to transmit an appropriate scheduling instruction. All of these operations must be completed in a given time period and the scheduling algorithm is comparatively complex.

In conclusion, it is necessary to provide a technology solution which is able to reduce the complexity of HSUPA scheduler.

SUMMARY OF THE INVENTION

The main object of the present invention is to provide a scheduling method and system for high speed uplink packet access, to reduce the complexity of the scheduler and improve the operation efficiency of the scheduler.

In order to achieve the above object, according to the first aspect of the present invention, the present invention provides a scheduling method for high speed uplink packet access which comprises the following two-level scheduling:

a first level scheduling for distributing the target RoT of each UE; and a second level scheduling for tracking the assigned to target RoT via transmitting a relative authority instruction, according to the current authority and channel quality of the UE.

The first level scheduling can comprise the non-serving RG DOWN transmitting determining step and the serving UE target RoT determining step, wherein the non-serving RG DOWN transmitting determining step comprises that when the cell is overloaded and the overloading satisfies the condition for transmitting RG DOWN, the non-serving UE that needs to be transmitted with RG DOWN is determined and the determined information is transmitted to the second level scheduler; the serving UE target RoT determining step comprises calculating the priorities of all serving UEs and sorting them in sequence, distributing the uplink load available for enhanced dedicated channel of the cell among the serving UEs, determining the target RoT resource assigned to each serving UE, and transmitting the determined information to the second level scheduler.

The second level scheduling can comprise the non-serving UE processing step and the serving UE processing step, wherein the non-serving UE processing step comprises transmitting RG DOWN when the non-serving UE needs to be transmitted with RG DOWN, the serving UE processing step comprises evaluating the channel quality after scheduling authority becoming effective according to the current information and history information of the serving UE, determining the particular authority to be granted to the serving UE according to the target RoT assigned to the serving UE and determining the authority instruction to be transmitted, and then transmitting a scheduling instruction to the serving UE.

Alternatively, prior to the first level scheduling, the received wide band power of all cells is measured periodically and then correspondingly filtered, so as to determine whether the cell is overloaded. In the non-serving RG DOWN transmitting determining step, it is determined whether the cell is overloaded or not according to the received wide band power value after the filtering and the target value of received wide band power configured by a radio network controller.

Alternatively, prior to the first level scheduling, the channel quality of individual UEs is measured periodically and then correspondingly filtered, so as to distribute the load.

Alternatively, prior to the first level scheduling, the happy bit information, the calculated LUPR and the received scheduling information of the serving UE are added up statistically for subsequent scheduling.

In the non-serving RG DOWN transmitting determining step, the condition for transmitting RG DOWN is that the ratio of non-serving enhanced dedicated channel power to all enhanced dedicated physical channel power of the overloaded cell is more than the target power ratio configured by the radio network controller.

The serving UE target RoT determining step can further comprise the following steps: determining the RoT of each cell which can be used for the enhanced dedicated channel service of the serving UEs based on the statistical information about the occupied load of the enhanced dedicated channel of each serving UE and the received wide band power of each cell; determining the RoT Target of each serving UE based on the employed scheduling algorithm and the scheduling priority sequence of each serving UE as well as the RoT resource available for each cell; transmitting AG to the serving UE that needs to be transmitted with AG, based on the available enhanced dedicated absolute authority channel resource and SG adjustment range of each serving UE; transmitting the RoT target of each serving UE to the corresponding second level scheduler.

Alternatively, in the non-serving UE processing step, RG HOLD is transmitted in case that the non-serving UE does not need to be transmitted with RG DOWN.

The serving UE processing step can further comprise the following steps: in case that Iub congestion exists, the RG DOWN is transmitted to the serving UE, ending the scheduling; in case no Iub congestion exists, based on the RoT target assigned to the serving UE and estimated signal-to-interference ratio calculation SG, if SG>LUPR, the RG UP is transmitted, if SG<LUPR, the RG DOWN is transmitted, and if SG=LUPR, RG HOLD is transmitted.

Preferably, one first level scheduler for the first level scheduling corresponds to one or more second level schedulers.

To this end, according to the second aspect of the present invention, the present invention provides a scheduling system for high speed uplink packet access which comprises: a first level scheduler comprising a non-serving RG DOWN transmitting determining module and a serving UE target RoT determining module, wherein the non-serving RG DOWN transmitting determining module determines the UE that needs to be transmitted with non-serving RG DOWN when the cell is overloaded and the overloading satisfies the condition for transmitting RG DOWN, and transmits the determined information to the second level scheduler, and the serving UE target RoT determining module is used for calculating the priorities of all serving UEs and sorting them in sequence, distributing the uplink load available for the enhanced dedicated channel of the cell among the serving UEs, determining the target RoT resource assigned to each serving UE, and transmitting the determined information to the second level scheduler; and a second level scheduler comprising a non-serving UE processing module and a serving UE processing module, wherein the non-serving UE processing module is used for transmitting RG DOWN when it needs to be transmitted with RG DOWN, and the serving UE processing module is used for evaluating the channel quality after scheduling authority becoming effective according to the current information and history information of the serving UE, determining the particular authority to be granted to the serving UE according to the target RoT assigned to the serving UE and determining the authority instruction to be transmitted, and then transmitting a scheduling instruction to the serving UE.

Preferably, one first level scheduler corresponds to one or more second level schedulers.

By the above technology solution, the present invention simplifies the scheduling process of scheduler by introducing the stage treatment (scheduling in level) into the HSUPA scheduler. By being dispersed into various processors the second level scheduling may be easily performed therein, which reduces the performance requirement imposed on one single processor, thus expanding the capability of system equipment. In the second level scheduling, the HARQ process can be exactly tracked and controlled, such that the cell load are strictly controlled.

BRIEF DESCRIPTION OF THE DRAWINGS

The Figures described herein provide a further understanding to the present invention and form a part of the application. The exemplary embodiments of the present invention and their description are provided for the purpose of explaining the present invention but not limiting the present invention, wherein.

DETAILED DESCRIPTION

The present invention is described in detail as follows in conjunction with the drawings.

Figure 1:
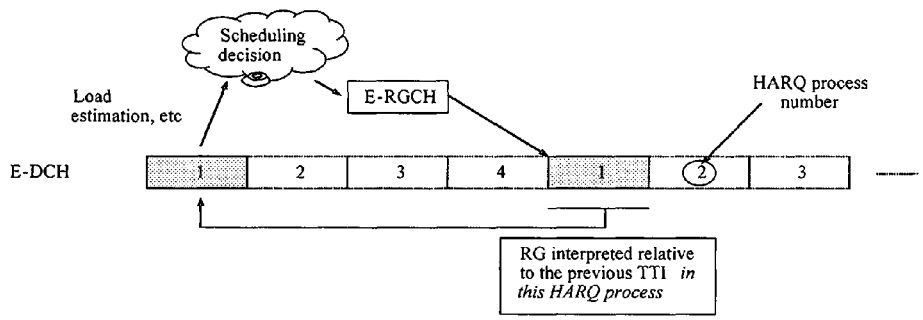
FIG. 1 is a diagram showing the relationship between the RG scheduling and HARQ process.
Figure 2:
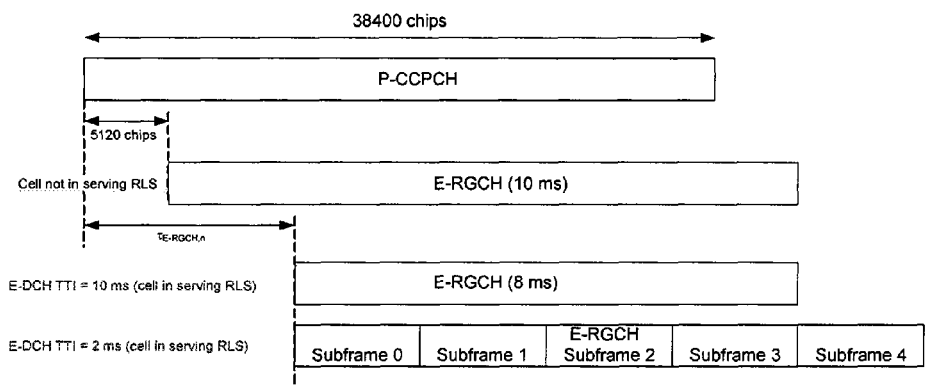
FIG. 2 is a diagram showing the relationship between E-RGCH time sequence and PCCPCH time sequence.
Figure 3:
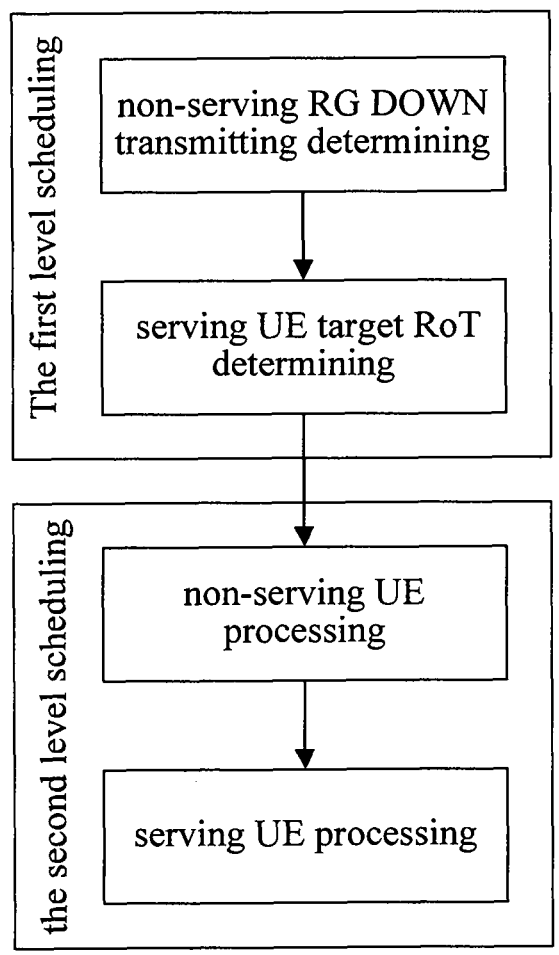
FIG. 3 is a flowchart of the scheduling method for high speed uplink packet access according the present invention.

Referring to FIG. 3, the scheduling method for high speed uplink packet access according to the present invention comprises the following two levels of scheduling:

a first level scheduling for distributing the target RoT to each UE; and a second level scheduling for tracking the assigned RoT through transmitting a relative authority instruction, based on the current authority and channel quality of a UE.

The first level scheduling can comprise a non-serving RG DOWN transmitting determining step and a serving UE target RoT determining step, wherein the non-serving RG DOWN transmitting determining step comprises that when the cell is overloaded and the overloading satisfies the condition for transmitting RG DOWN, the non-serving UE that needs to be transmitted with RG DOWN is determined and the determined information is transmitted to the second level scheduler and the serving UE target RoT determining step comprises calculating the priorities of all serving UEs and sorting them in sequence, distributing the uplink load of the cell available for the enhanced dedicated channel among the serving UEs, determining the target RoT resource assigned to each serving UE, and transmitting the determined information to the second level scheduler.

The second level scheduling can comprise a non-serving UE processing step and a serving UE processing step, wherein the non-serving UE processing step comprises transmitting RG DOWN when the non-serving UE needs to be transmitted with RG DOWN and the serving UE processing step comprises evaluating the channel quality after scheduling authority becoming effective according to the current information and history information of the serving UE, determining the particular authority to be granted to the serving UE according to the target RoT assigned to the serving UE and determining the authority instruction to be transmitted and then transmitting a scheduling instruction to the serving UE.

Alternatively, prior to the first level scheduling, the received wide band power of all cells is measured periodically and the correspondingly filtered, so as to determine whether a cell is overloaded. In the non-serving RG DOWN transmitting determining step, it is determined whether the cell is overloaded or not according to the received wide band power value after filtering and the target value of received wide band power configured by a radio network controller.

Alternatively, prior to the first level scheduling, the channel quality of each UE is measured periodically and then correspondingly filtered for distributing the load.

Alternatively, prior to the first level scheduling, the happy bit information, the calculated LUPR and the received scheduling information of the serving UE are added up statistically for the subsequent scheduling.

In the non-serving RG DOWN transmitting determining step, the condition for transmitting RG DOWN can be that the ratio of the non-serving enhanced dedicated channel power to all enhanced dedicated physical channel power of the overloaded cell is more than the target power ratio configured by the radio network controller.

The serving UE target RoT determining step can further comprise the following steps: determining the RoT of each cell which is available for the enhanced dedicated channel service of the serving UEs based on the statistical information about the occupied enhanced dedicated channel load of each serving UE and the received wide band power of each cell; determining the RoT target of each serving UE based on the employed scheduling algorithm and the scheduling priority sequence of each serving UE as well as the RoT resource available for each cell; transmitting AG to the serving UE that needs to be transmitted with AG, based on available enhanced dedicated absolute authority channel resource and SG adjustment range of each serving UE; transmitting RoT target of each serving UE to the corresponding second level scheduler.

Alternatively, in the non-serving UE processing step, RG HOLD is transmitted in case that the non-serving UE does not need to be transmitted with RG DOWN.

The serving UE processing step can further comprise the following steps: in case that Iub congestion exists, RG DOWN is transmitted to the serving UE and the scheduling is finished; and in case that no Iub congestion exists, SG is calculated based on the assigned RoT target of the serving UE and estimated signal-to-interference ratio and then if SG>LUPR, RG UP is transmitted, if SG<LUPR, RG DOWN is transmitted, and if SG=LUPR, RG HOLD is transmitted.

Preferably, one first level scheduler for executing the first level scheduling corresponds to one or more second level scheduler.

Figure 4:
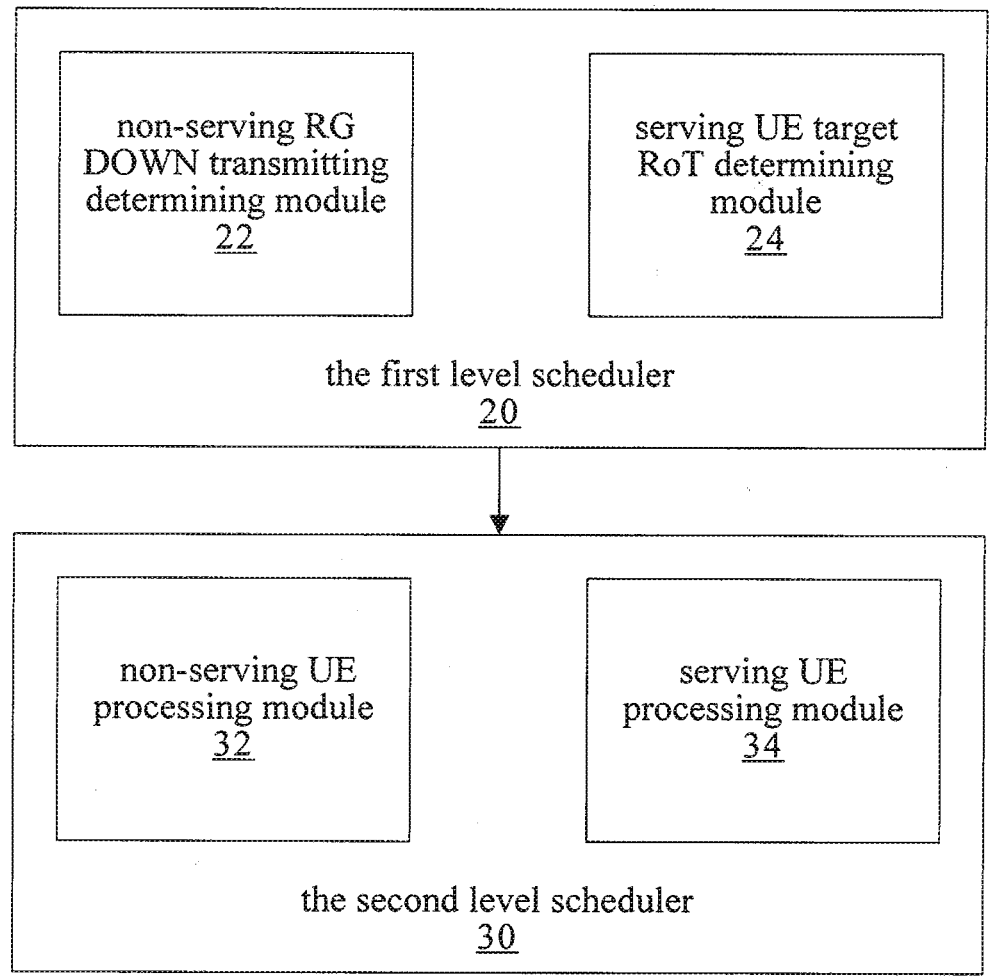
FIG. 4 is a block diagram of the scheduling system for high speed uplink packet access according the present invention.

Referring to FIG. 4, the scheduling system 10 for high speed packet access according to the present invention comprises: the first level scheduler 20 comprising a non-serving RG DOWN transmitting determining module 22 and a serving UE target RoT determining module 24, wherein the non-serving RG DOWN transmitting determining module 22 is used for determining the UE that needs to be transmitted with the non-serving RG DOWN when the cell is overloaded and the overloading satisfies the condition for transmitting RG DOWN, and transmitting the determined information to the second level scheduler 30 and the serving UE target RoT determining module 24 is used for calculating the priorities of all serving UEs and sorting them in sequence, distributing the uplink load of the cell available for the enhanced dedicated channel among the serving UEs, determining the target RoT resource assigned to each serving UE, and transmitting the determined information to the second level scheduler 30; and a second level scheduler 30 comprising a non-serving UE processing module 32 and a serving UE processing module 34, wherein the non-serving UE processing module 32 is used for transmitting RG DOWN when it needs to transmit RG DOWN, and the serving UE processing module 34 is used for evaluating the channel quality after scheduling authority becoming effective according to the current information and history information of the serving UE, determining the particular authority to be granted to the serving UE according to the target RoT assigned to the serving UE and determining the authority instruction to be transmitted, and then transmitting a scheduling instruction to the serving UE.

Preferably, one first level scheduler 20 corresponds to one or more second level scheduler 30.

The present invention relates to communication field, in particular to high speed uplink packet access service scheduling in CDMA radio communication system. The technology solution employed by the present invention is that HSUPA scheduler operates in two-level scheduling.

Figure 5:
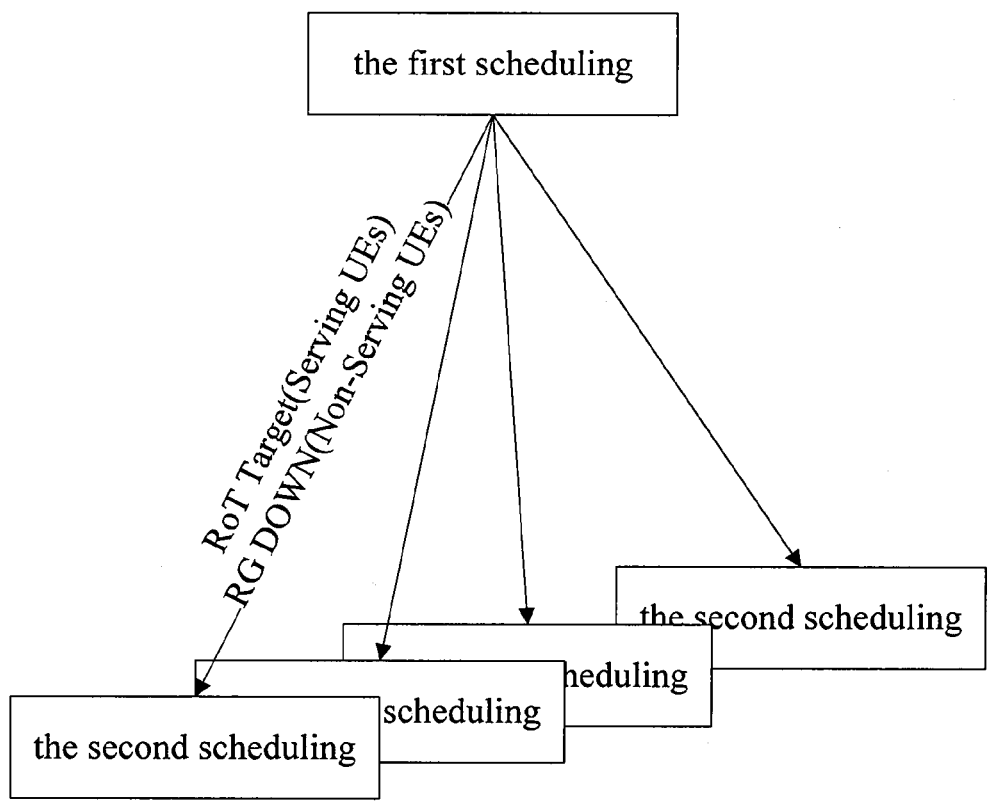
FIG. 5 is a diagram showing the relationship between a first level scheduling and a second level scheduling according to the present invention.

The functions to be achieved in the first level scheduling are: 1) determining whether the cell is overloaded based on the statistical information of cell load over a history period, and whether the overloading satisfies the condition for transmitting RG DOWN to the non-serving UE, and if it is satisfied, the UE that needs to be transmitted with the non-serving RG DOWN is determined and this information is transmitted to the second level scheduler to transmit the non-serving RG DOWN; 2) determining the cell load used by HSUPA service available for the serving UE, calculating the priorities of all related serving UEs according to the statistical information of each serving UE over the history period, and sorting the calculated priorities in sequence, then distributing among the serving UEs the uplink load of the cell available for E-DCH based on a certain scheduling algorithm, determining the RoT (Rise over Thermal) target resource assigned to each serving UE and transmitting the RoT target resource to corresponding second level scheduler for scheduling. The scheduling period of the first level scheduling is not less than 10 ms, in order to reduce the operation frequency of the first level scheduling. The typical operation period can be 40/80/160 ms, but without being limited thereto. The functions to be achieved in the second level scheduling are: 1) as for non-serving UE, if it is needed to be transmitted with RG DOWN, RG DOWN is transmitted directly without further operations; 2) as for Serving UE, the channel quality after the scheduling becoming effective is estimated according to the current information and history information of the UE, then determining the particular authority to be granted to the UE based on the RoT target assigned to the UE, so as to determine the authority instruction to be transmitted, and then transmitting a scheduling instruction to the UE. Thus it is realized to reasonably distribute RoT resource among individuals UEs while the behavior of each UE at each time point can be exactly controlled, and at the same time the complexity of scheduler is reduced. The relationship between the first level scheduling and the second level scheduling is shown in FIG. 5 wherein one first level scheduler is corresponding to a plurality of the second level schedulers.

The concrete solution of the present invention is described below:

Process 1: the received wide band power (RTWP) of all cells is measured periodically and then correspondingly filtered; the channel quality of each UE is measured periodically and then correspondingly filtered; the received scheduling information (SI), happy bit, etc. of the serving UE and the calculated LUPR are added up statistically, obtaining a statistical result.

The following filtering algorithm is applied to RTWP:

$$RTWP_{i,f} = \alpha * RTWP_{i,f} + (1-\alpha) RTWP_{i,m};$$

wherein $RTWP_{i,f}$ is the filtered RTWP of the $i^{th}$ cell, $RTWP_{i,m}$ is the RTWP currently measured of the ith cell, and $\alpha$ is the filtering coefficient;

the following filtering algorithm is employed to filter the SIR of the UE:

$$SIR_{j,f} = \beta * SIR_{j,f} + (1-\beta) SIR_{j,m};$$

Wherein $SIR_{j,r}$ is the SIR of the $j^{th}$ UE after filtering, $SIR_{j,m}$ is the currently measured SIR of the $j^{th}$ UE, and $\beta$ is the filtering coefficient;

The received SI, and happy bit of the serving UE and the calculated LUPR are statistically processed and respectively denoted by $SI_j$, $HB_j$, and $LUPR_j$, wherein j means the $j^{th}$ UE.

Figure 6:
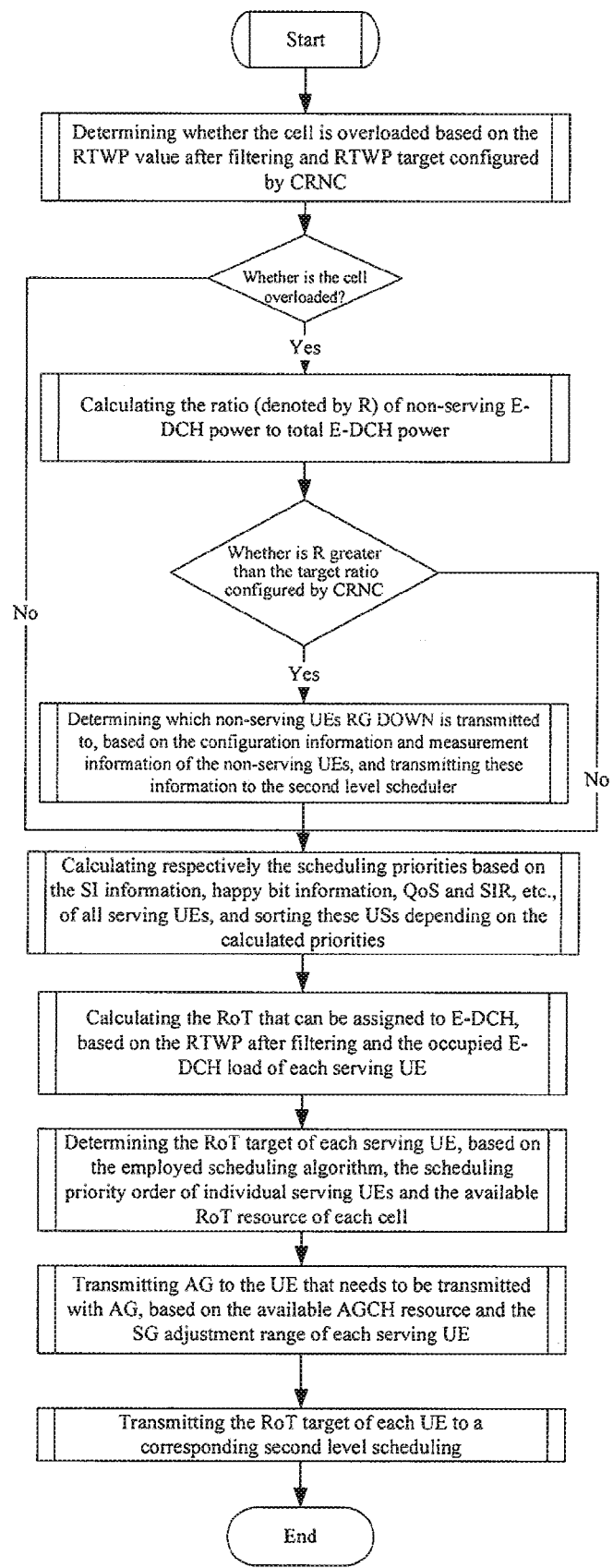
FIG. 6 is a flowchart of a first level scheduling according to an embodiment of the present invention.

Process 2: the first level scheduling is triggered periodically (or by an event) for processing the overloaded cell and distributing the cell load available for E-DCH among individual serving UEs. This scheduling takes into consideration all cells that can make softer handoff and all HSUPA users related to these cells, thus in one Node B there is only one first level scheduling in the cells having same frequency. After completing the first level scheduling, the information of the non-serving UE that needs to be transmitted with RG DOWN is transmitted to a corresponding second level scheduling based on the scheduling result, AG instruction is transmitted to corresponding UE, and the corresponding RoT target of each serving UE is transmitted to the corresponding second level scheduler for scheduling. The flow is as shown in FIG. 6. The particular steps are as follows:

Step 1: determining whether the filtered RTWP of each cell is greater than the RTWP target configured by RNC wherein if yes, Step 2 is performed, or else Step 5 is performed;

Step 2: calculating the ratio of non-serving E-DCH power of overloaded cells to all E-DCH power, wherein i means the $i^{th}$ cell;

Step 3: determining whether the ratio Ri obtained in Step 2 is greater than the target ratio configured by RNC wherein if yes, Step 4 is performed, or else Step 5 is performed;

Step 4: determining which non-serving UEs the RG DOWN is transmitted to based on the configuration and measurement information of non-serving UEs, and transmitting these information to the second level scheduler for scheduling;

In particular, Step 1-4 are described as follows:

Determining whether the filtration of each cell is overloaded or not wherein if it is overloaded, then overload processing is performed;

```
for i = 1..N
{
    if (RTWP_{i,f} > RTWP_{j,Target})
    {
```

Calculate the ratio of the non-serving E-DCH power of the cell to all E-DCH power, denoted as $R_{i,p}$

```
if (R_{i,p} > R_{i,Target})
{
```

RG DOWN is transmitted to the non-serving UEs with a poorer channel quality and a lower QoS requirement, and these UEs are delivered to the second level scheduler so as to really perform RG DOWN transmission;

```
        }
    }
}
``` wherein N is the number of the cells, $RTWP_{i,Target}$ is the target value of the RTWP threshold of the $i^{th}$ cell configured by RNC, $R_{i,Target}$ is the ratio of the non-serving E-DCH of the $i^{th}$ cell configured by RNC to all E-DCH power.

Step 5: based on the SI information, happy bit, quality of service (QoS), signal-to-interference ratio (SIR), etc. of all saving UEs, the scheduling priority of individual serving UEs are calculated respectively, and based on the calculated priority, the priority is sorted in sequence for all serving UEs;

In particular,

```
for (j = 1..M)
{
    Pj = F(SIRj,f,SIj,HBj,LUPRj,Qj,ch)
}
``` wherein, $P_j$ is the scheduling priority of the $j^{th}$ serving UE, F is the function to calculate the priority, $Q_{j,ch}$ is the evaluated channel quality of the $j^{th}$ serving UE;

all UEs are sorted from high to low by their scheduling priorities.

Step 6: based on the statistical occupied E-DCH load of each serving UE and RTWP of each cell, the RoT of each cell available for E-DCH of the serving UEs is determined;

Concretely, the remaining load of the cell is calculated with the following equation:

```
for (i = 1..N)
{
    RoTi,r = RoTi,t – RoTi,c
}
``` wherein $RoT_{i,r}$ is the remaining RoT of the $i^{th}$ cell, $RoT_{i,t}$ is the cell RoT threshold of the $i^{th}$ cell which is calculated by the RTWP target configured by RNC, $RoT_{i,c}$ is the cell load statistical value calculated by the $RTWP_{i,f}$ of the $i^{th}$ cell.

The currently occupied load of all serving UEs is calculated which is added to the corresponding cell, thus obtaining all load available for the serving E-DCH;

```
for (i = 1..N)
{
    RoTi,a = RoTi,r
}
for (j = 1..M)
{
    for (i = 1..Nj)
    {
        RoTi,a = RoTi,a+RoTj,i
    }
}
``` wherein M is the number of the serving UEs, $N_j$ is the number of the radio link (RL) of the $j^{th}$ serving UE, $RoT_{i,a}$ is the RoT of the $i^{th}$ cell which is available for the serving E-DCH, $RoT_{j,i}$ is the RoT generated for the current E-DCH of the $i^{th}$ cell by the $j^{th}$ serving UE.

Step 7: determining the RoT target of each serving UE based on the employed scheduling algorithm, the scheduling priority order of individual serving UEs (all serving UEs which have been sorted in sequence), and the available RoT resource of each cell;

Step 8: Transmitting AG to the serving UE that needs to be transmitted with AG based on the available E-AGCH resource and the SG adjustment range of each serving UE;

Step 9: transmitting the RoT target of each serving UE to a corresponding second level scheduler.

Figure 7:
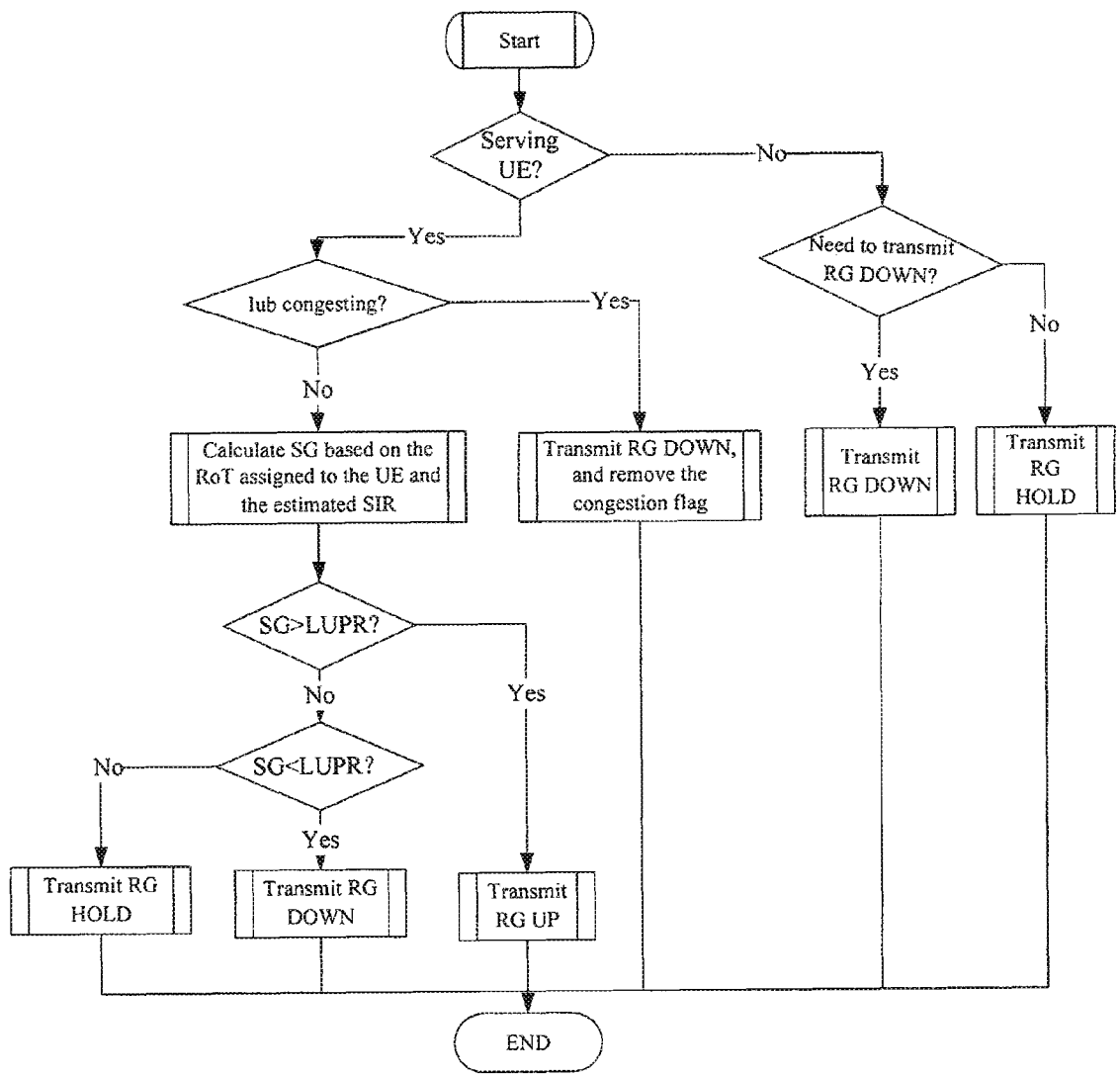
FIG. 7 is a flowchart of a second level scheduling according to an embodiment of the present invention.

Process 3: The second level scheduling is initiated for each UE after the coding of each TTI. As for a non-serving UE, if the RG DOWN information of that non-serving UE is received, then RG DOWN is transmitted and as for a serving UE, according to the assigned RoT target and the estimated channel quality when the scheduling is effective, the SG assigned to the UE is determined, and then a corresponding RG instruction is transmitted; if SG<LUPR, DOWN is transmitted; if SG>LUPR, UP is transmitted; if SG=LUPR, HOLD is transmitted. As shown in FIG. 7, the detailed scheduling steps are described as follows:

Step 1: determining whether it is a serving UE or a non-serving UE, and if it is a non-serving UE, then Step 2 will be performed, or else Step 5 will be performed;

Step 2: determining whether it is necessary to transmit RG DOWN to the UE, and if it is necessary, then Step 3 will be performed, or else Step 4 will be performed;

Step 3: transmitting RG DOWN to the UE, removing the flag of transmitting RG DOWN, and ending the scheduling;

Step 4: transmitting RG HOLD to the UE, and ending the scheduling;

Step 5: determining whether there is Iub (interface between an RNC and a Node B) congestion, if there is Iub congestion, then Step 6 will be performed, or else Step 7 will be performed;

Step 6: transmitting RG DOWN to the UE, removing the flag for congestion, and ending the scheduling;

Step 7: calculating SG according to the RoT target assigned to the UE and the estimated SIR;

Step 8: determining whether the SG is greater than LUPR, and if yes, Step 9 will be performed, or else Step 10 will be performed;

Step 9: transmitting RG UP, and ending the scheduling;

Step 10: determining whether the SG is less than LUPR, and if yes, Step 11 will be performed, or else Step 12 will be performed;

Step 11: transmitting RG DOWN, and ending the scheduling;

Step 12: transmitting RG HOLD, and ending the scheduling;

Concretely,

```
if (Serving UE)
{
```

Calculate SG based on the RoT target assigned to the UE and SIR etc.;

```
if (SG < LUPR)
{
    Transmit RG DOWN;
}
else if (SG > LUPR)
{
    Transmit RG UP;
}
else
{
```

```
            Transmit RG HOLD;
        }
    }
    else
    {
        if (it is necessary to transmit RG DOWN)
        {
            Transmit RG DOWN;
            Remove the flag for transmitting RG DOWN;
        }
    }
``` wherein LUPR is the LUPR of HARQ process corresponding to the current scheduling of the current UE.

Due to scheduling process being performed in two levels, the operation period of the first level scheduling is 10/20/40/80 ms, which substantially extends the operation period compared to 2 ms employed by prior art algorithm; the second level scheduling runs once for each E-DCH TTI; for the UE with 2 ms E-DCH TTI, scheduling frequency is same with that in prior art scheduling algorithm; for the UE with 10 ms E-DCH TTI, scheduling frequency is equal to ⅕ of original frequency; moreover, the complex scheduling calculation is performed in the first scheduling, thus the scheduler complexity is greatly reduced, and the scheduler operation efficiency is improved.

The preferred embodiments described above are for the purpose of explanation not for limiting the present invention. Those skilled in the art will appreciate that various modifications and changes are possible. Any variations, equivalent substitutions, and modifications not departing from the spirits and principles of the present invention shall fall into the scope claimed by the present invention.

What is claimed is:

1. A scheduling method for high speed uplink packet access, comprising following two levels of scheduling:
   a first level scheduling for assigning a target Rise over Thermal (ROT) to each User Equipment (UE), wherein said first level scheduling comprises a non-serving Relative Grant (RG) DOWN transmitting determining step and a serving UE target RoT determining step, wherein the non-serving RG DOWN transmitting determining step comprises, when a cell is overloaded and the overloading satisfies a condition for transmitting RG DOWN, determining a non-serving UE that needs to be transmitted with RG DOWN and transmitting determined information from the step of determining the non-serving UE to a second level scheduler, wherein the serving UE target RoT determining step comprises calculating priorities of all serving UEs and sorting them in sequence, assigning an uplink load of the cell available for an enhanced dedicated channel among the serving UEs, determining a target RoT resource assigned to each of the serving UEs, and transmitting the determined information from the step of determining the target RoT resource to the second level scheduler; and
   a second level scheduling for tracking the assigned target RoT through transmitting a relative grant instruction based on current grant and channel quality of said each UE, wherein said second level scheduling comprises a processing step for each of non-serving UEs and a processing step for the each of the serving UEs, wherein said processing step for each of non-serving UEs comprises transmitting RG DOWN when the non-serving UE is determined to need to be transmitted with RG DOWN, wherein said processing step for the each of the serving UEs comprises evaluating the channel quality after a scheduling grant becomes effective according to current information and historical information of the each of the serving UEs, determining particular grant for the each of the serving UEs according to the target RoT assigned to the each of the serving UEs, determining a scheduling grant instruction to be transmitted, and then transmitting the scheduling grant instruction to the each of the serving UEs, wherein the second level scheduling is performed by the second level scheduler.

2. The scheduling method according to claim 1, wherein prior to the first level scheduling, a received wide band power of each of all cells is measured periodically and then correspondingly filtered, so as to determine whether the cell is overloaded.

3. The scheduling method according to claim 1, wherein prior to the first level scheduling, the channel quality of the each UE is measured periodically and then correspondingly filtered, so as to assign a load.

4. The scheduling method according to claim 1, wherein prior to the first level scheduling, received scheduling information of the each of the serving UEs, happy bit information and calculated Last Used Power Ratio (LUPR) are added up statistically for subsequent scheduling.

5. The scheduling method according to claim 2, wherein in said non-serving Relative Grant (RG) DOWN transmitting determining step, it is determined whether the cell is overloaded based on a value of the received wide band power after filtering and a received wide band power target value configured by a radio network controller.

6. The scheduling method according to claim 1, wherein in said non-serving RG DOWN transmitting determining step, the condition for transmitting RG DOWN is that a ratio of a non-serving enhanced dedicated power of the overloaded cell to power of all enhanced dedicated channels is greater than a target power ratio configured by a radio network controller.

7. The scheduling method according to claim 1, wherein said serving UE target RoT determining step further comprises: determining an RoT of the cell available for service of the enhanced dedicated channel of the each of the serving UEs based on a statistical occupied load of the enhanced dedicated channel of the each of the serving UEs and a received wide band power of each cell; determining a RoT target of the each of the serving UEs based on an employed scheduling algorithm and the scheduling priority sequence of individual serving UEs as well as an available RoT resource of each cell; transmitting Absolute Grant (AG) to the each of the serving UEs that needs to be transmitted with AG based on available enhanced dedicated absolute grant channel resource and Serving Grant (SG) adjustment range of the each of the serving UEs; and transmitting the RoT target of the each of the serving UEs to a corresponding scheduler configured to perform the second level scheduling.

8. The scheduling method according to claim 1, wherein in said non-serving UE processing step, RG HOLD is transmitted in case that the non-serving UE does not need to be transmitted with RG DOWN.

9. The scheduling method according to claim 1, wherein said serving UE processing step further comprises: in case Iub (Interface to Universal Terrestrial Radio Access Network (UTRAN) NodeB (between Node B and Radio Network Controllers (RNC))) congestion exists, RG DOWN is transmitted to the each of the serving UEs and ending the second level scheduling; and in case that no Iub congestion exists, Serving Grant (SG) is calculated based on the assigned RoT target of the each of the serving UEs and an estimated signal-to-interference ratio, and if SG>Last Used Power Ratio (LUPR), RG UP is transmitted; if SG<LUPR, RG DOWN is transmitted; and if SG=LUPR, RG HOLD is transmitted.

10. The scheduling method according to claim 1, wherein one first level scheduler for performing the first level scheduling corresponds to the second level scheduler and additional second level schedulers for performing the second level scheduling.

11. A scheduling system for high speed uplink packet access, comprising:

a first level scheduler; and a second level scheduler;

wherein the first level scheduler comprises a non-serving Relative Grant (RG) DOWN transmitting determining module and a serving User Equipment (UE) target Rise over Thermal (ROT) determining module, wherein said non-serving RG DOWN transmitting determining module is used for determining a UE that needs to be transmitted with non-serving RG DOWN when a cell is overloaded and the overloading satisfies a condition for transmitting RG DOWN, and transmitting the determined information from the step of determining the UE to the second level scheduler, and wherein said serving UE target RoT determining module is used for calculating priorities of all serving UEs and sorting them in sequence, assigning an uplink load of the cell available for an enhanced dedicated channel among the serving UEs, determining a target RoT resource assigned to each serving UE, and transmitting the determined information from the step of determining the target RoT resource to the second level scheduler; and wherein the second level scheduler comprises a non-serving UE processing module and a serving UE processing module, wherein said non-serving UE processing module is used for transmitting RG DOWN when it needs to be transmitted with RG DOWN, and said serving UE processing module is used for evaluating channel quality after a scheduling grant becomes effective according to current information and history information of each serving UE, determining a particular grant for each serving UE according to the target RoT resource assigned to each serving UE, determining a scheduling grant instruction to be transmitted, and then transmitting the scheduling grant instruction to said serving UE.

12. The scheduling system according to claim 11 wherein said first level scheduler corresponds to the second level scheduler and additional second level schedulers.

* * * * *